US009948085B2

(12) United States Patent
Nagahama

(10) Patent No.: US 9,948,085 B2
(45) Date of Patent: Apr. 17, 2018

(54) ELECTRIC-WIRE PROTECTION DEVICE

(71) Applicant: SUMITOMO WIRING SYSTEMS, LTD., Yokkaichi, Mie (JP)

(72) Inventor: Takahiro Nagahama, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 398 days.

(21) Appl. No.: 14/707,823

(22) Filed: May 8, 2015

(65) Prior Publication Data
US 2015/0340855 A1 Nov. 26, 2015

(30) Foreign Application Priority Data

May 22, 2014 (JP) ................. 2014-106260

(51) Int. Cl.
H02H 3/08 (2006.01)
H02H 6/00 (2006.01)
H02H 7/22 (2006.01)
(52) U.S. Cl.
CPC .............. H02H 3/085 (2013.01); H02H 6/00 (2013.01); H02H 7/228 (2013.01)
(58) Field of Classification Search
CPC ........... H02H 3/085; H02H 6/00; H02H 7/228
USPC ........................................................ 361/87
See application file for complete search history.

(56) References Cited

U.S. PATENT DOCUMENTS 7,640,080 B2 12/2009 Nakamura et al.
2013/0163138 A1 6/2013 Higuchi et al.
2015/0116883 A1* 4/2015 Kimoto ................. B60R 16/02
361/103

FOREIGN PATENT DOCUMENTS

JP 2007-295776 A 11/2007

OTHER PUBLICATIONS

Jun. 29, 2015 Office Action issued in German Application No. 10 2015 108 009.5.

* cited by examiner

Primary Examiner — Thienvu Tran
Assistant Examiner — Kevin J Comber
(74) Attorney, Agent, or Firm — Oliff PLC

(57) ABSTRACT

An electric-wire protection device protects at least one electric wire among an electric-wire bundle that bundles a plurality of electric wires that are used to supply power to a plurality of loads from a power source Ba. Calculation circuit calculates an increased temperature of the electric wire from an initial temperature at the time that the estimate begins, based on a load current Is that has been detected and a thermal characteristic of the electric wire, and estimates the temperature of the electric wire by adding the increased temperature to the initial temperature. Current flow information supply portion supplies to the calculation circuit current flow information related to current flow to a load other than a subject load. Calculation circuit corrects the initial temperature by a correction value that corresponds to the current flow information that exists at the time the estimate begins.

8 Claims, 7 Drawing Sheets

FIG. 4

|   | LOAD NAME | CURRENT VALUE (A) | ADDED TEMPERATURE [°C] |
|---|---|---|---|
| A | Headlight LO | 5A | 5°C |
| B | Rear defogger | 20A | 20°C |
| C | Audio | 4A | 4°C |
| D | Fog light | 5A | 5°C |
| . | . |  | . |
| . | . |  | . |
| . | . |  | . |

FIG. 7

|   | LOAD NAME | CURRENT FLOW EXISTS? | ADDED TEMPERATURE [°C] |
|---|---|---|---|
| A | Headlight LO | Yes | 5°C |
| B | Rear defogger | Yes | 20°C |
| C | Audio | Yes | 4°C |
| D | Fog light | Yes | 5°C |
| . | . |  | . |
| . | . |  | . |
| . | . |  | . |

ELECTRIC-WIRE PROTECTION DEVICE

TECHNICAL FIELD

Preferred embodiments of this disclosure relate to an electric-wire protection device, and particularly to a technology that estimates an electric-wire temperature, based on a current flowing in an electric wire.

BACKGROUND TECHNOLOGY

It is conventionally known to estimate an electric wire temperature based on a current flowing through the electric wire, for example, a technology shown in Patent Reference 1. Based on a current flowing in the electric wire, it is possible determine an increase or decrease in temperature and calculate an estimated temperature of a conductor (electric wire).

PRIOR ART REFERENCE

Patent Reference

[Patent Reference 1] Japanese Published Patent Application 2007-295776 (P2007-295776A)

SUMMARY

Problems to be Resolved

In the case of a single electric wire, an estimated temperature is suitably calculated by the above disclosed technology. However, if electric wires were bundled and installed in a vehicle, ifs possible that an electric-wire temperature is not accurately determined. That is, if electric wires were bundled and installed, the actual electric-wire temperature (actual temperature) may be higher than the estimated temperature due to heat from the other electric wires. As a result, the time for the estimated temperature to reach an upper limit maybe delayed in comparison to the actual temperature of the wire. Such a delay may result in unintended smoke or damage to the wiring.

Thus, preferred embodiments were completed based on the above situation and provides a technology in which even when a temperature of the specified electric wire is estimated in an electric-wire arrangement structure having an electric-wire bundle, reliability of electric-wire protection can be maintained.

Means of Solving the Problem

An electric-wire protection device disclosed in this specification protects at least one electric wire among an electric-wire bundle that bundles a plurality of electric wires that are used to supply power to a plurality of loads from a power source. It is provided with a switch portion that is arranged on a current flow path from the power source to a subject load corresponding to the electric wire and turns on and off a supply of power to the subject load; a current detection portion that detects a load current to the subject load that flows to the switch portion; a calculation circuit that calculates an increased temperature of the electric wire from an initial temperature that exists at the time that an estimate begins, based on the load current that has been detected and a thermal characteristic of the electric wire, and estimates a temperature of the electric wire by adding the increased temperature to the initial temperature; a protection circuit that determines whether a temperature of the electric wire that has been estimated is equal to or higher than a specified upper limit temperature, and turns off the switch portion and suspends a supply of power from the power source to the subject load when it is determined that the estimated temperature of the electric wire is equal to or higher than the specified upper limit temperature; a current flow information supply portion that supplies to the calculation circuit current flow information related to current flow to a load other than the subject load, wherein the calculation circuit corrects the initial temperature by a correction value corresponding to the current flow information that exists at the time the estimate begins.

According to this structure, when the electric-wire temperature of one electric wire corresponding to a subject load among a plurality of loads is estimated, upon considering heat generation due to a current that flows to other electric wires other than the electric wire for which the electric-wire temperature is estimated, the initial temperature is corrected. Thereby, in the electric-wire arrangement structure having the electric-wire bundle, even when the temperature of a specified electric wire is estimated, effects due to other electric wires are reduced, and reliability of electric-wire protection can be maintained.

In the electric-wire protection device described above, the current detection portion may be arranged according to each load; the current detection portion that detects a load current to the loads other than the subject load may constitute the current flow information supply portion and supply to the calculation circuit a detected load current as the current flow information; and the calculation circuit may correct the initial temperature, using a temperature, which corresponds to the load current of the loads other than the subject load detected by the current flow information supply portion that exists at the time that the estimate begins, as the correction value.

According to this structure, the correction value is determined by using the load current that has been actually detected by the current detection portion. Thus, accuracy of the correction value is high.

In the electric-wire protection device described above, the current flow information supply portion may supply to the calculation circuit existence of current flow to the loads other than the subject load as the current flow information; and the calculation circuit may correct the initial temperature corresponding to existence of current flow to the loads other than the subject load.

According to this structure, the correction value can be determined without detecting a load current value of the loads other than the subject load.

Additionally, in the electric-wire protection device described above, there may be provided a plurality of switch input detection circuits that are arranged corresponding to the respective loads and output to the calculation circuit an instruction signal that gives an instruction to begin the current flow to the respective loads according to an input of an on signal of an external switch, and a storage portion that stores, as the current flow information as the existence of current flow to the loads other than the subject load, a current consumption value of the plurality of loads as a constant. The calculation circuit may calculate a load current of the loads other than the subject load that exists at the time that the estimate begins, based on (i) the instruction signal and (ii) the current consumption value that is stored in the storage portion, and correct the initial temperature, using the temperature corresponding to the calculated load current as the correction value.

According to this structure, without detecting a load current value of the loads other than the subject load, the correction value can be determined by using the current consumption value of each load stored in the storage portion.

Furthermore, in the electric-wire protection device described above, the initial temperature may be set on the assumption that there is current flow to the loads other than the subject load, and the calculation circuit may subtract the correction value from the initial temperature when the initial temperature is corrected.

Even in this structure in which the correction value is subtracted from the initial temperature as well, when an electric-wire temperature of an electric wire corresponding to one load of a plurality of loads is estimated, effects due to other electric wires are reduced, and reliability of electric-wire protection can be maintained.

Additionally, in the electric-wire protection device described above, a temperature detection portion that detects an environment temperature in the vicinity of the electric-wire protection device may be provided, wherein the calculation circuit may estimate the temperature of the electric wire, using the environment temperature as the initial temperature; and when the initial temperature is corrected, the correction value may be added to the environment temperature.

According to this structure, the electric-wire temperature corresponding to the environment temperature can be estimated by using the environment temperature as the initial temperature.

In the electric-wire protection device described above, the current detection portion may detect the load current to the subject load that flows to the switch portion every specified time; the calculation circuit may calculate an increase of temperature from the initial temperature, based on a heat generation characteristic and a heat radiation characteristic of the electric wire within the specified time due to the load current that has been detected and estimate a temperature of the electric wire by adding the increased temperature of the electric wire to the initial temperature. When it is determined that the temperature of the electric wire that has been estimated is not equal to or higher than the specified upper limit temperature, the protection circuit may, in the calculation circuit, calculate an increase in temperature from the initial temperature, based on a heat generation characteristic and a heat radiation characteristic of the one electric wire at the specified time due to the load current that has been newly detected, using the increased temperature, and newly estimate the temperature of the one electric wire by adding the new increased temperature to the initial temperature. The calculation circuit may calculate the increased temperature of the electric wire, based on the heat generation characteristic and the heat radiation characteristic of the electric wire within the specified time according to the following relationship equation. Here, a reference temperature is the initial temperature, and a value of $\Delta Tw(0)$ is the correction value.

$$\Delta Tw(n) = \Delta Tw(n-1) \times \exp(-\Delta t/\tau w) + Rthw \times Rw(n-1) \times I(n-1)^2 \times (1-\exp(-\Delta t/\tau w))$$

Here, I (n): detected load current value (A) at the time of $n^{th}$ (integer of 1 or higher) detection
$\Delta Tw$ (n): electric-wire increased temperature (° C.) at the time of $n^{th}$ detection $$Rw(n) = Rw(0) \times (1 + \kappa w \times (Tw - T_0))$$

electric-wire resistance (Ω) at the time of $n^{th}$ detection
Rw (0): electric-wire resistance (Ω) at reference temperature To Rthw: electric-wire thermal resistance (° C./W)
τw: electric-wire heat radiation time constant (s)
κw: electric-wire resistance temperature coefficient (/° C.)
Δt: specified time (s)
Tw=reference temperature+ΔTw (n)
electric-wire temperature (° C.) at the time of $n^{th}$ detection According to this structure, by correcting the initial temperature of the above relationship equation with ΔTw (0), in an electric-wire arrangement structure having an electric-wire bundle, when the temperature of a specified electric wire is estimated, by applying the above relationship equation, the temperature of the specified electric wire can be suitably estimated.

Effects

According to preferred embodiments, in an electric-wire arrangement structure having an electric-wire bundle, even when the temperature of a specified electric wire is estimated, reliability of electric-wire protection can be maintained.

BRIEF DESCRIPTION OF THE DRAWINGS

FIG. 4 is a table showing the relationship among a load, a load current, and an added temperature.

FIG. 7 is a table showing the relationship among a load, the presence or absence of current flow, and an added temperature.

EMBODIMENTS

Embodiment

An embodiment related to a particular preferred embodiment is explained with reference to FIGS. 1-6.

1. Circuit Structure

Figure 1:
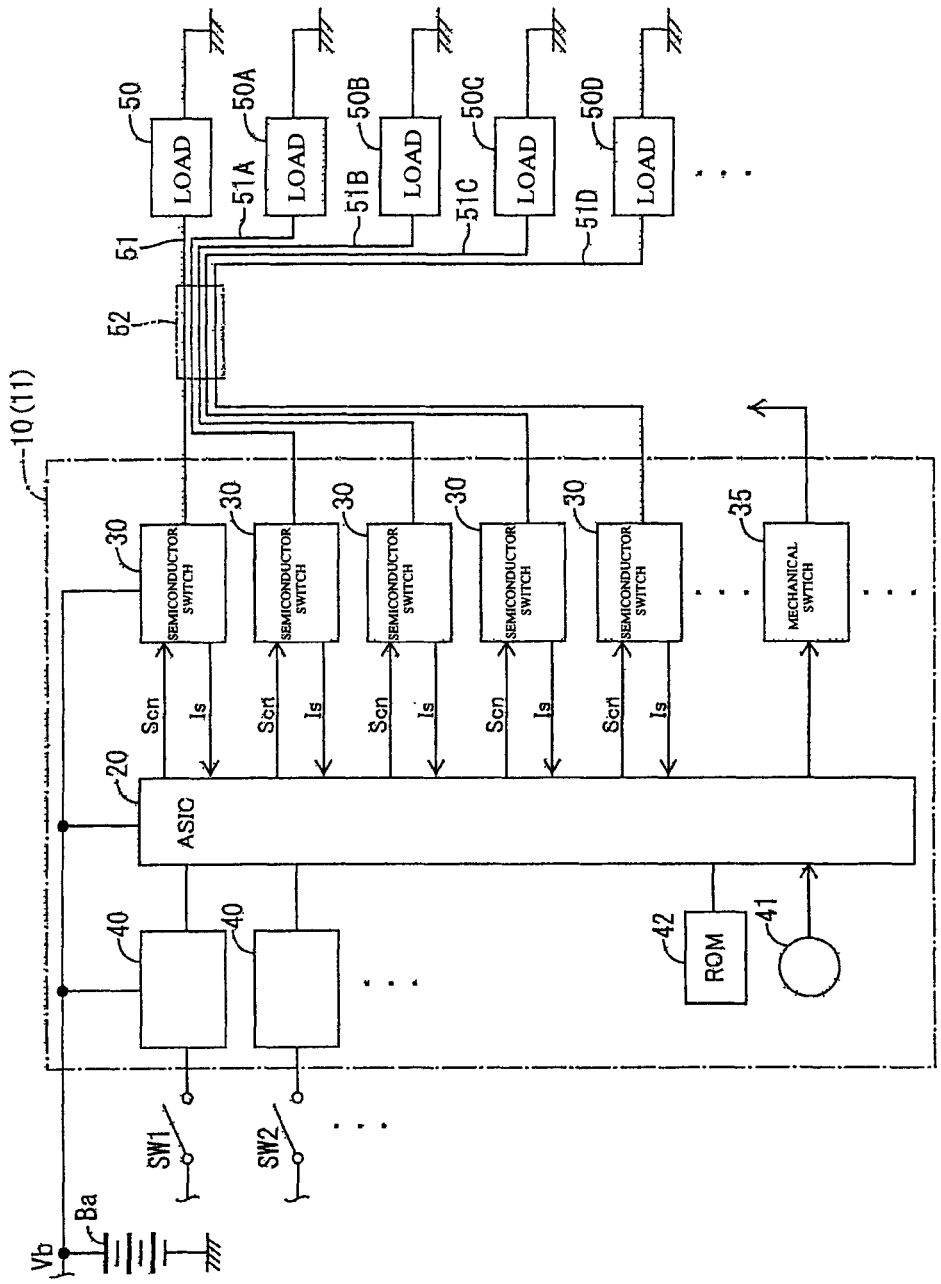
FIG. 1 is a schematic block diagram of a power supply system including an electric-wire protection device related to an embodiment.

As shown in FIG. 1, an electric-wire protection device 10 is arranged between a power source Ba and a plurality of loads (50, 50A-50D). The electric-wire protection device 10 protects an electric wire 51, which corresponds to a load 50 of the plurality of loads and is used to supply power to the load 50 from the power source Ba.

As shown in FIG. 1, the electric-wire protection device 10 generally includes an electric-wire protection portion 20, a plurality of semiconductor switch circuits (switch portions) 30, a plurality of SW (switch) input detection circuits 40, an environment temperature sensor (temperature detection portion) 41, and a ROM 42. The electric-wire protection device 10 is formed on a printed circuit board 11.

Additionally, this embodiment shows an example in which the electric-wire protection device 10 is arranged within an engine compartment of a vehicle. An example is shown in which the power source Ba is a battery, and as a load 50, for example, a headlight HI for a high beam is drivingly controlled by the electric-wire protection device 10 via the electric wire 51. Additionally, the load 50A is a headlight LO for a low beam, the load 50B is a rear defogger, the load 50C is audio equipment, and the load 50D is a fog light (see FIG. 4). The respective loads (50, 50A-50D) are connected to the electric-wire protection portion 20 via the corresponding electric wires 51, 51A-51D and the corresponding semiconductor switch circuits 30. Additionally, the loads are not limited to these, and the switch portions are not limited to semiconductor switch circuits. As shown in FIG. 1, they can be a mechanical switch 35 such as a relay having a mechanical contact point. Furthermore, hereafter, there is no need for distinguishing the plurality of loads, and the "loads 50" and "electric wires 51" are generally used.

Figure 2:
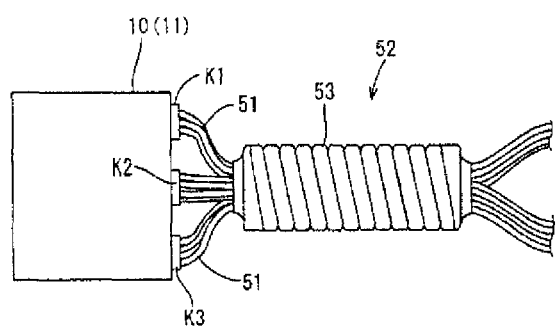
FIG. 2 is a schematic explanatory view showing an electric-wire bundle.

Additionally, in this embodiment, as shown in FIG. 2, a plurality of electric wires (51, 51A-51D) includes an electric-wire bundle (an example of an electric-wire bundle) 52, in which the electric wires are bundled, and the electric-wire bundle 52 is covered with, for example, a tape 53. The plurality of electric wires (51, 51A-51D) are connected to the printed circuit board 11, that is, the electric-wire protection device 10, via a plurality of connectors (K1-K3), for example.

Furthermore, in FIG. 1, a battery voltage Vb is directly applied to the semiconductor switch circuits 30. However, the battery voltage Vb is converted to a specified voltage and applied to the electric-wire protection portion 20 and the SW input detection circuits 40 via a voltage converter (undepicted).

Additionally, the electric-wire protection device 10 related to this preferred embodiment is not limited to this embodiment, but can apply to any device that supplies power to a load(s) and is provided with a plurality of electric wires including an electric-wire bundle. Also, the load(s) is not limited to a motor.

Figure 3:
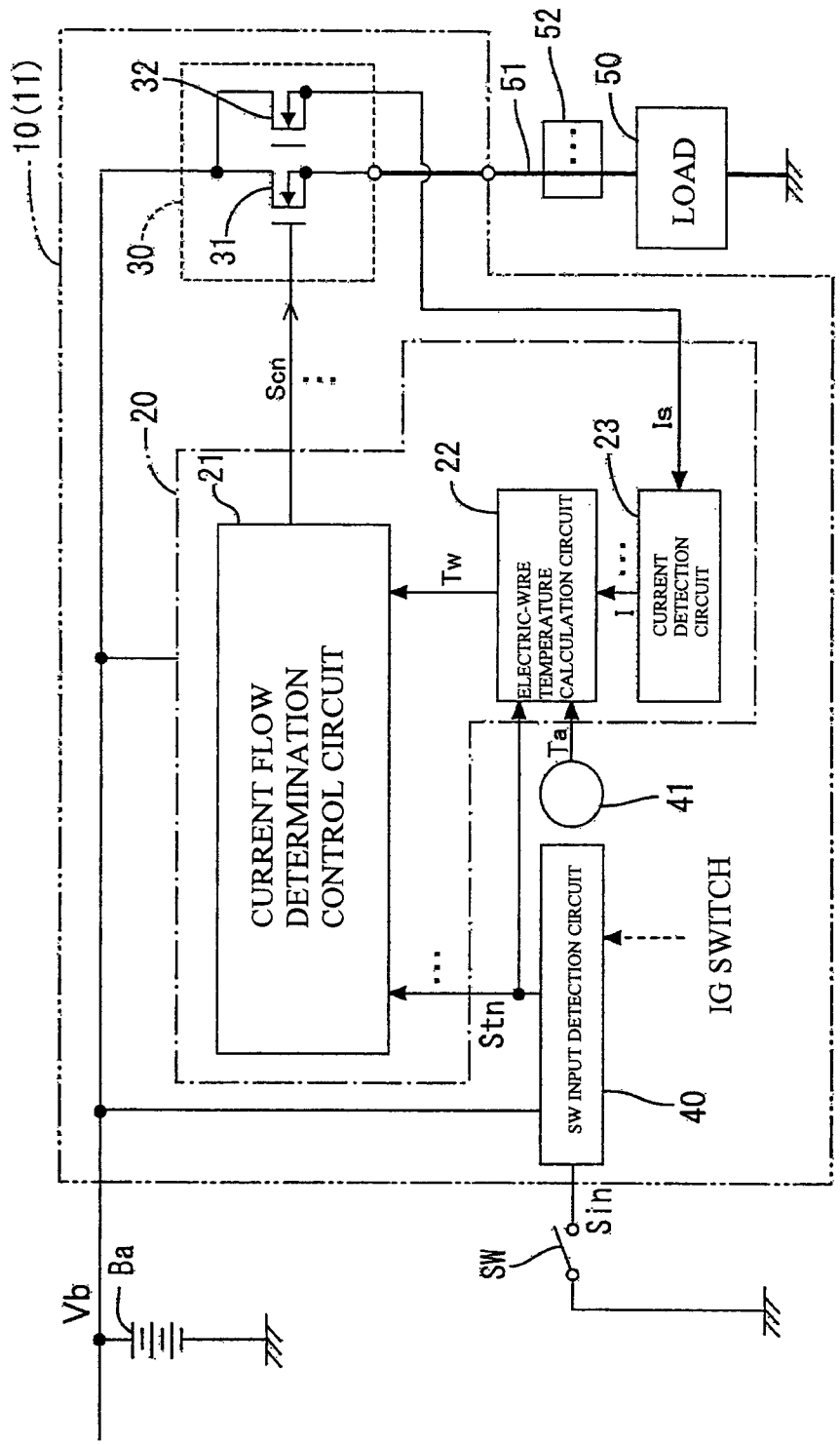
FIG. 3 is a schematic block diagram of an electric-wire protection device related to an embodiment.

Next, with reference to FIG. 3, each portion of the electric-wire protection device 10 is described more in detail. Furthermore, FIG. 3 only shows one of each component of which there is a plurality in the electric-wire protection device 10. Specifically, a current detection circuit (an example of a current detection portion and a current flow information supply portion) 23, the semiconductor switch circuit 30, and the SW input detection circuit 40 that are shown in FIG. 3 are individually arranged corresponding to each load 50. By using this structure, the electric-wire protection device 10 protects at least one electric wire of an electric-wire bundle. Furthermore, this is not limited to this, but the current detection circuit 23 and the SW input detection circuit 40 may be formed as one unit and correspond to the respective loads 50.

The SW input detection circuit 40 is connected to the input switch SW. When the input switch SW is turned on, the SW input detection circuit 40 receives an input signal Sin that gives an instruction to start current flow to the load 50 and generates a current flow instruction signal (an example of current flow information) Stn. That is, in this embodiment, current flow to the load 50 is instructed by turning on of the input switch SW.

Additionally, the SW input detection circuit 40 receives the input signal Sin that gives an instruction to end the current flow to the load 50 when the input switch SW is turned off.

The semiconductor switch circuit 30 is arranged between the battery Ba and the current flow path 51, and switches between current flow and non-current flow from the battery Ba to the load 50 according to a current flow control signal Scn from the electric-wire protection portion 20. Here, the semiconductor switch circuit 30 is formed as a semiconductor switch and includes (i) a main switch 31 that supplies power to the load 50 and (ii) a sense transistor (current detection portion) 32 that detects a load current (load current) I. For example, as shown in FIG. 3, the main switch 31 and the sense transistor 32 are formed by an N channel FET (field effect transistor).

The electric-wire protection portion 20 includes a current flow determination control circuit 21, an electric-wire temperature calculation circuit 22, the current detection circuit 23, and an environment temperature sensor 41. According to the current flow instruction signal Stn, current flow of the switch circuit 30 is allowed, and when the temperature (hereafter referred to as the "electric-wire temperature") Tw of the electric wire 51 reaches a specified upper limit value Tsm, current flow of the switch circuit 30 is prohibited, and the current flow path 51 is protected.

The current detection portion includes the current detection circuit 23 and the sense transistor 32 and detects the load current I that flows to the electric wire 51 via the switch circuit 30. The current detection circuit 23 converts a sense current detected by the sense transistor 32 to the load current (load current) I by a specified factor. Information of the load current I is provided to the electric-wire temperature calculation circuit 22.

The environment temperature sensor (an example of the temperature detection portion) 41 is arranged, for example, in the vicinity of the electric-wire temperature calculation circuit 22 and here, for example, detects an environment temperature Ta of an engine compartment of a vehicle. Information of the detected environment temperature Ta is provided to the electric-wire temperature calculation circuit 22. Additionally, the environment temperature Ta is not limited to the temperature of the engine compartment.

The electric-wire temperature calculation circuit (an example of the calculation circuit) 22 calculates an increased temperature $\Delta Tw$ of the electric wire 51 from the initial temperature (reference temperature) To at the time the estimate begins, based on a thermal characteristic of the electric wire and the load current I detected by the current detection circuit 23, and estimates the electric-wire temperature Tw by adding the increased temperature $\Delta Tw$ to the initial temperature. Here, the initial temperature To at the time that the estimate begins is, for example, the environment temperature (an example of the "initial temperature") Ta detected by the environment temperature sensor 41 at the time that the estimate begins.

Additionally, in this embodiment, the electric-wire temperature calculation circuit 22 calculates an increased temperature $\Delta Tw$ of the electric wire 51 from the initial temperature (reference temperature) To at the time that the estimate begins, based on a heat generation characteristic and a heat radiation characteristic of the electric wire 51 due to the load current I. That is, the electric-wire temperature calculation circuit 22 calculates the electric-wire increased temperature $\Delta Tw$ from the environment temperature Ta, based on the difference between the heat generation of the electric wire 51 by the load current I and the heat radiation of the electric wire 51, and uses this in the estimate. Additionally, the electric-wire temperature calculation circuit 22 adds the calculated electric-wire increased temperature $\Delta Tw$ to the environment temperature Ta and calculates the electric-wire temperature Tw. The electric-wire temperature calculation circuit 22 provides to the current flow determination control circuit 21 the information of the calculated electric-wire increased temperature ΔTw and the electric-wire temperature Tw. Furthermore, the initial temperature is not limited to the environment temperature at the time that the estimate begins.

Here, for example, the electric-wire temperature calculation circuit 22 samples the load current I every specified time Δt, substitutes the value of each load current I into the following equation (1), and calculates the electric-wire increased temperature ΔTw.

$$\Delta Tw(n) = \Delta Tw(n-1) \times \exp(-\Delta t/\tau w) + Rthw \times Rw(n-1) \times I(n-1)^2 \times (1-\exp(-\Delta t/\tau w)) \quad (1)$$

Here, I (n): detection load current value (A) at the time of $n^{th}$ (integer of 1 or higher) detection
ΔTw (n): electric-wire increased temperature (° C.) at the time of $n^{th}$ detection $$Rw(n) = Rw(0) \times (1 + \kappa w \times (Tw - To))$$

electric-wire resistance (Ω) at the time of $n^{th}$ detection
Rw (0): electric-wire resistance (Ω) at reference temperature (initial temperature) To
Rthw: electric-wire thermal resistance (° C./W)
τw: electric-wire heat radiation time constant (s)
κw: electric-wire resistance temperature coefficient (/° C.)
Δt: specified time (s)
Tw=reference temperature (initial temperature)+ΔTw (n)
electric-wire temperature (° C.) at the time of $n^{th}$ detection
Additionally, in equation (1), the first part without the load current I shows heat radiation of the electric wire 51, and the second part with the load current I shows heat generation of the electric wire 51 by the load current I. That is, if current flow to the load 50 is shut off and there is no load current I, the electric-wire temperature Tw is determined by heat radiation of the electric wire 51.

Furthermore, as mentioned later, when the electric-wire temperature Tw is estimated, the electric-wire temperature calculation circuit 22 corrects the environment temperature Ta (initial temperature), using the temperature corresponding to the load current of the loads other than the subject load to which current is flowing, at the time at which the estimate begins, as a correction value. In this embodiment, the correction value is a value of ΔTw (0) that is an initial value of the electric-wire increased temperature. That is, in this embodiment, the initial temperature To is described as Initial temperature To=Environment temperature Ta+ΔTw(0) (2).

At that time, the value of ΔTw (0), which normally is "zero," is changed to a specified temperature value.

The current flow determination control circuit (an example of the "protection circuit") 21 controls current flow and non-current flow of the semiconductor switch circuit 30 according to the current flow instruction signal Stn from the SW input detection circuit 40, and prohibits current flow of the switch circuit 30 when the electric-wire temperature Tw reaches a specified upper limit value Tsm. Furthermore, here, the upper limit value Tsm of the electric-wire temperature Tw is an electric-wire smoke temperature. That is, when the electric-wire temperature Tw reaches the electric-wire smoke temperature Tsm, the current flow determination control circuit 21 turns off the main switch 31 of the switch circuit 30 and prohibits current flow to the load 50 in order to protect the electric wire 51.

2. Correction of Initial Temperature (Environment Temperature)

Figure 5:
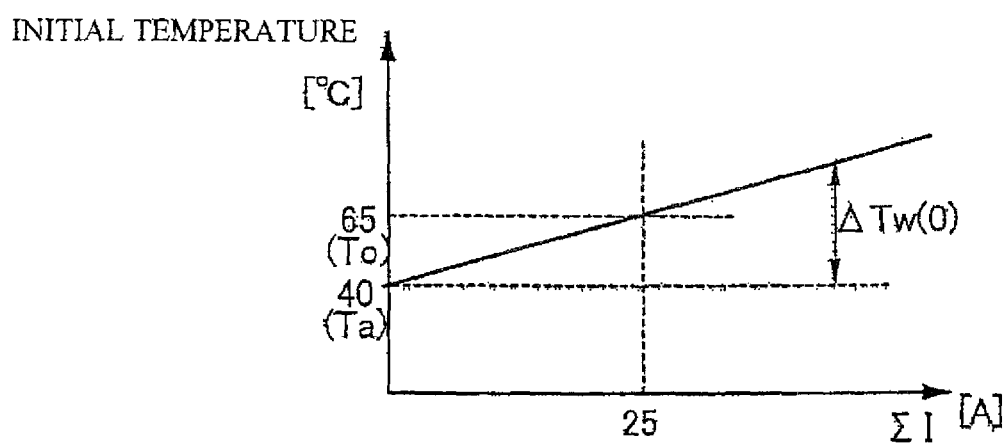
FIG. 5 is a graph showing the relationship between a total load current and a correction temperature (ΔTw(0)).
Figure 6:
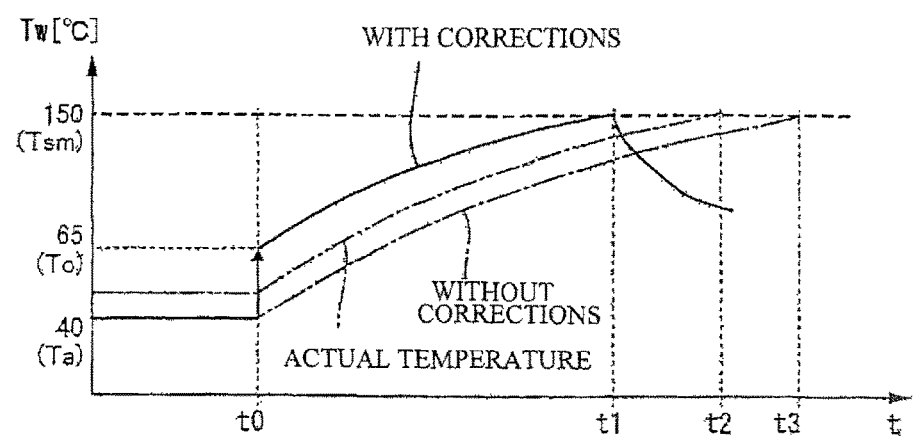
FIG. 6 is a graph showing changes in various electric-wire temperatures.

Next, with reference to FIGS. 4-6, correction of the initial temperature To (environment temperature Ta) is explained.

In this embodiment, when the electric-wire temperature Tw of one electric wire of a plurality of electric wires (51, 51A-51D), that is, when the electric-wire temperature Tw of the electric wire 51 of the headlight H1 is estimated here, heat generation due to a current that flows to the other electric wires (51A-51D) is considered. Specifically, according to equation (2), the initial temperature To is corrected in accordance with the current that flows to the other electric wires (51A-51D).

At that time, the electric-wire temperature calculation circuit 22 corrects the initial temperature To, using, as a correction value (ΔTw (0)), a temperature (added temperature) corresponding to the load current I (an example of current flow information) detected by each current detection circuit 23 at the time that the estimate begins. For example, at the time that the estimate begins, if the headlight LO as the load 50A, and the rear defogger as the load 50B, are turned on, as shown in FIG. 4, the detected current value of the headlight LO becomes 5A, and the detected current value of the rear defogger becomes 20A. The temperatures (added temperatures) corresponding to the respective detected current values are, for example, 5° C. and 20° C., respectively. Thus, in this case, ΔTw (0)=25° C. Additionally, the respective added temperatures corresponding to the respective detected current values shown in FIG. 4 are determined in advance by temperature measurement or the like of the respective electric wires of the electric-wire bundle 52, by experiment, and are stored in the ROM 42.

If the environment temperature Ta is 40° C. at the time that the estimate begins, according to equation (2), 25° C. is added to the initial temperature To 40° C., which makes 65° C. (see FIG. 5). Furthermore, the map, shown by the straight line of FIG. 5, showing the relationship between a total current value ΣI of the other loads and the correction value (ΔTw (0)) of the initial temperature To can be, for example, stored in the ROM 43 as data, and the calculation circuit can correct the initial temperature To with reference to the map. In this case, the time for correcting the initial temperature To can be reduced.

That is, as shown in FIG. 6, at time t0, the estimate of the electric-wire temperature Tw of the electric wire 51 for the headlight HI begins, and the initial temperature To is corrected. Then, as shown by the solid line of FIG. 6, when the estimated electric-wire temperature Tw reaches the electric-wire smoke temperature (an example of a "specified upper limit temperature") Tsm at time t1, the current flow determination control circuit 21 turns off the main switch 31 of the semiconductor switch circuit 30 and prohibits current flow to the headlight HI, which is the load 50, so as to protect the electric wire 51. Thus, when the initial temperature To is corrected, the estimated electric-wire temperature Tw can reach the electric-wire smoke temperature Tsm, faster than time t2 at which the actual temperature of the electric wire 51, shown by the two-dot chain line of FIG. 6, reaches the electric-wire smoke temperature Tsm.

Meanwhile, if the initial temperature To is not corrected, as shown in the one-dot chain line of FIG. 6, the estimated electric-wire temperature Tw reaches the electric-wire smoke temperature Tsm at time t3. This time is later than time t2 at which the actual temperature of the electric wire 51 reaches the electric-wire smoke temperature Tsm.

3. Effects of this Embodiment

In this embodiment, when the electric-wire temperature Tw of the electric wire 51 for the headlight HI is estimated, the initial temperature To is corrected upon considering heat generation due to a current that flows to other electric wires (51A-51D). Thereby, in the electric-wire arrangement structure having the electric-wire bundle 52, even when the temperature of specified electric wire is estimated, effects due to other electric wires are reduced, and reliability of electric-wire protection can be maintained.

Another Embodiment

This invention is not limited to the above-explained embodiment with reference to the above description and drawings. For example, the following embodiments and the like are also included in the technical scope of this invention. (1) In this embodiment, an example was shown in which, when the initial temperature To is corrected by correction of (ΔTw (0)), a load current of loads other than the subject load detected by the current detection circuit 23 was used, but it is not limited to this. A correction value of the initial temperature To can also be determined based on the existence of current flow to the loads other than the subject load. For example, as shown in FIG. 7, a map showing the relationship between the existence of current flow to the loads other than the subject load and a correction value is stored in the ROM 42. Then, each switch input detection circuit (an example of a current flow information supply portion) 40 detects the existence of current flow to the loads other than the subject load by the input signal Sin from each switch and supplies the existence of current flow to the loads other than the subject load to the calculation circuit 22 by the current flow instruction signal (an example of current flow information) Stn. Furthermore, it is also acceptable for the calculation circuit 22 to determine an added temperature (correction value) with reference to the map shown in FIG. 7 and correct the initial temperature To. In this case, the correction value can be determined, based on the existence of current flow to the loads other than the subject load without detecting the load current of the loads other than the subject load.

Furthermore, when the correction value is determined based on the existence of current flow to the loads other than the subject load, the current values (current consumption value) of the plurality of loads other than the subject load, as shown in FIG. 4, are defined as constants and are stored in the ROM (an example of the current flow information supply portion) 42. Additionally, the calculation circuit 22 may calculate a load current (total current value ΣI) of the loads other than the subject load at the time that the estimate begins, based on (i) an instruction signal (an example of current flow information) Stn from each switch input detection circuit (an example of the current flow information supply portion) and (ii) a current consumption value (an example of the current flow information) stored in the ROM 42, and use the temperature corresponding to the calculated load current ΣI as the correction value (ΔTw (0)). Even in this case as well, without detecting the load current of the loads other than the subject load, a correction value can be determined based on the instruction signal Stn and the current consumption value, in other words, based on the existence of current flow to the loads other than the subject load.

(2) In the embodiment described above, an example was shown in which the initial temperature To was the environment temperature Ta and a correction value was added to the environment temperature Ta, but it is not limited to this. The initial temperature To may be set on the assumption that there is current flow to the loads other than the subject load, and the calculation circuit 22 can subtract the correction value from the initial temperature To when the initial temperature To is corrected. Even in this case as well, when an electric-wire temperature of one electric wire corresponding to a subject load of a plurality of loads is estimated, effects due to other electric wires are reduced, and reliability of electric-wire protection can be maintained.

(3) In the embodiment described above, an example was shown in which the current detection portion was constituted by the current detection circuit 23 and the sense transistor 32, but it is not limited to this. A load current can be detected, for example, by using shunt resistance. Alternatively, it can be detected based on a drain-source voltage Vds of a main switch (N channel FET).

(4) In the embodiment described above, an example was shown in which each circuit of the electric-wire protection device 10 is constituted by an individual circuit, but it is not limited to this. For example, the electric-wire protection portion 20 and the SW input detection circuit 40 can be constituted by an ASIC (application-specific integrated circuit).

EXPLANATION OF THE SYMBOLS

10 Electric-wire protection device
11 Printed circuit board
21 Current flow determination control circuit (protection circuit)
22 Electric-wire temperature calculation circuit (calculation circuit)
23 Electric detection circuit (current detection portion)
30 Semiconductor switch circuit (switch portion)
31 Main switch (switch portion)
32 Sense transistor (current detection portion)
41 Environment temperature sensor (temperature detection portion)
42 ROM (storage portion)
50 Headlight HI (load)
51 Electric wires
52 Electric-wire bundle
I Load current
Ta Environment temperature
To Initial temperature
Tsm Electric-wire smoke temperature (upper limit temperature)
Tw Electric-wire temperature
ΔTw Electric-wire increased temperature
ΔTw (0) Initial value of electric-wire increased temperature

The invention claimed is:
1. An electric-wire protection device configured to protect at least one electric wire among a plurality of electric wires bundled in an electric wire bundle, the electric wire bundle configured to supply power to a subject load and a plurality of loads from a power source, the electric-wire protection device comprising:
   a switch portion configured to supply current from the power source to the subject load, the switch portion arranged on a current flow path that corresponds to the at least one electric wire, and turns on and off a supply of power to the subject load;
   a current detection portion configured to detect a load current to the subject load that flows to the switch portion;
   a current flow information supply portion configured to determine which of the plurality of loads is receiving current;

a calculation circuit configured to:
receive information from the current flow information supply portion as to which of the plurality of loads is receiving current;
calculate an increased temperature of the at least one electric wire from an initial temperature that exists at a time that an estimate begins, the initial temperature being based in part on the temperature effect on the at least one electric wire due to current being supplied to all of the plurality of loads, the increased temperature being based on (1) the load current that has been detected by the current detection portion and a thermal characteristic of the at least one electric wire and (2) the information from the current flow information supply portion as to which of the plurality of loads is receiving current; and
estimate a temperature of the at least one electric wire by adding the increased temperature to the initial temperature; and
a protection circuit configured to determine whether the estimated temperature of the at least one electric wire is equal to or higher than a specified upper limit temperature, and turns off the switch portion and suspends a supply of power from the power source to the subject load when it is determined that the estimated temperature of the at least one electric wire is equal to or higher than the specified upper limit temperature.

2. The electric-wire protection device as set forth in claim 1, wherein:
the current flow information supply portion supplies, to the calculation circuit, an indication of which of the plurality of loads is not receiving current; and
the calculation circuit subtracts the temperature effect for each of the plurality of loads that is not receiving current when determining the estimated temperature.

3. An electric-wire protection device configured to protect at least one electric wire among a plurality of electric wires bundled in an electric wire bundle, the electric wire bundle configured to supply power to a subject load and a plurality of loads from a power source, the electric-wire protection device comprising:
a switch portion configured to supply current from the power source to the subject load, the switch portion arranged on a current flow path that corresponds to the at least one electric wire, and turns on and off a supply of power to the subject load;
a current detection portion configured to detect a load current to the subject load that flows to the switch portion;
a calculation circuit configured to calculate an increased temperature of the at least one electric wire from an initial temperature that exists at a time that an estimate begins, based on the load current that has been detected and a thermal characteristic of the at least one electric wire, and estimates a temperature of the at least one electric wire by adding the increased temperature to the initial temperature;
a protection circuit configured to determine whether the estimated temperature of the at least one electric wire is equal to or higher than a specified upper limit temperature, and turns off the switch portion and suspends a supply of power from the power source to the subject load when it is determined that the estimated temperature of the at least one electric wire is equal to or higher than the specified upper limit temperature;
a current flow information supply portion configured to supply current flow information to the calculation circuit, the current flow information being related to current flow to one or more of the plurality of loads;
a plurality of switch input detection circuits that are arranged corresponding to the plurality of loads and output to the calculation circuit an instruction signal that gives an instruction to begin the current flow to the plurality of loads according to an input of an on signal of an external switch;
a storage portion that stores a current consumption value, as the current flow information, of the plurality of loads as a constant; and
a temperature detection portion that detects an environment temperature in a vicinity of the electric-wire protection device; wherein:
the calculation circuit corrects the initial temperature by a correction value corresponding to the current flow information that exists at the time the estimate begins;
the current flow information supply portion supplies, to the calculation circuit, existence of current flow to the one or more of the plurality of loads as the current flow information;
the calculation circuit corrects the initial temperature corresponding to existence of current flow to the one or more of the plurality of loads;
the calculation circuit calculates a load current of the one or more of the plurality of loads that exists at the time that the estimate begins, based on (i) the instruction signal and (ii) the current consumption value that is stored in the storage portion, and corrects the initial temperature, using the temperature corresponding to the calculated load current as the correction value;
the calculation circuit estimates the temperature of the at least one electric wire as the initial temperature;
when the initial temperature is corrected, the correction value is added to the environment temperature;
the current detection portion detects the load current to the subject load that flows to the switch portion every specified time;
the calculation circuit calculates an increase in temperature from the initial temperature, based on a heat generation characteristic and a heat radiation characteristic of the at least one electric wire within the specified time due to the load current that has been detected and estimates a temperature of the at least one electric wire by adding the increased temperature of the at least one electric wire to the initial temperature;
when it is determined that the temperature of the at least one electric wire that has been estimated is not equal to or higher than the specified upper limit temperature, the protection circuit calculates an increase in temperature from the initial temperature, based on a heat generation characteristic and a heat radiation characteristic of the at least one electric wire at the specified time due to the load current that has been newly detected, using the increased temperature, and newly estimates the temperature of the at least one electric wire by adding the new increased temperature to the initial temperature;
the calculation circuit calculates the increased temperature of the at least one electric wire, based on the heat generation characteristic and the heat radiation characteristic of the at least one electric wire within the specified time according to the following equation;
wherein a reference temperature is the initial temperature, and a value of $\Delta Tw(0)$ is the correction value:

$$\Delta Tw(n) = \Delta Tw(n-1) \times \exp(-\Delta t/\tau w) + Rthw \times Rw(n-1) \times I(n-1)^2 \times (1-\exp(-\Delta t/\tau w));$$

wherein:

I (n): detected load current value (A) at the time of $n^{th}$ (integer of 1 or higher) detection;

$\Delta$Tw (n): electric-wire increased temperature (° C.) at the time of $n^{th}$ detection;

$$Rw(n)=Rw(0)\times(1+\kappa w\times(Tw-To))$$

electric-wire resistance ($\Omega$) at the time of $n^{th}$ detection;

Rw (0): electric-wire resistance ($\Omega$) at reference temperature To;

Rthw: electric-wire thermal resistance (° C./W);

$\tau$w: electric-wire heat radiation time constant (s);

$\kappa$W: electric-wire resistance temperature coefficient (/° C.);

$\Delta$t: specified time (s); and

Tw=reference temperature+$\Delta$Tw (n)

electric-wire temperature (° C.) at the time of $n^{th}$ detection.

4. An electric-wire protection device configured to protect at least one electric wire among a plurality of electric wires bundled in an electric wire bundle, the electric wire bundle configured to supply power to a subject load and a plurality of loads from a power source, the electric-wire protection device comprising:
a switch portion configured to supply current from the power source to the subject load, the switch portion arranged on a current flow path that corresponds to the at least one electric wire, and turns on and off a supply of power to the subject load;
a current detection portion configured to detect a load current to the subject load that flows to the switch portion;
a current flow information supply portion configured to determine current flow to one or more of the plurality of loads;
a storage portion that stores a value for the current to each of the plurality of loads as a constant;
a calculation circuit configured to:
receive information from the current flow information supply portion as to which of the plurality of loads is receiving current;
receive from the storage portion the value for each of the plurality of loads that is receiving current; and
calculate an increased temperature of the at least one electric wire from an initial temperature that exists at a time that an estimate begins, based on the load current that has been detected and a thermal characteristic of the at least one electric wire and the values from the storage portion; and
estimate a temperature of the at least one electric wire by adding the increased temperature to the initial temperature; and
a protection circuit configured to determine whether the estimated temperature of the at least one electric wire is equal to or higher than a specified upper limit temperature, and turns off the switch portion and suspends a supply of power from the power source to the subject load when it is determined that the estimated temperature of the at least one electric wire is equal to or higher than the specified upper limit temperature.

5. The electric-wire protection device as set forth in claim 4, further comprising:
a temperature detection portion that detects an environment temperature in a vicinity of the electric-wire protection device, wherein:
the calculation circuit estimates the temperature of the at least one electric wire as the initial temperature; and
when the initial temperature is corrected, the correction value is added to the environment temperature.

6. The electric-wire protection device as set forth in claim 4, wherein the values stored in the storage portion are temperature values.

7. An electric-wire protection device configured to protect at least one electric wire among a plurality of electric wires bundled in an electric wire bundle, the electric wire bundle configured to supply power to a subject load and a plurality of loads from a power source, the electric-wire protection device comprising:
a switch portion configured to supply current from the power source to the subject load, the switch portion arranged on a current flow path that corresponds to the at least one electric wire, and turns on and off a supply of power to the subject load;
a current detection portion configured to detect a load current to the subject load;
a storage portion that stores a value for each of the one or more plurality of loads as a constant;
a current flow information supply portion that determines if there is a current load to the each of the one or more plurality of loads;
a calculation circuit configured to:
receive from the current flow information supply portion a determination of which of the plurality of loads is receiving current;
receive from the storage portion the value for the plurality of loads that are receiving current; and
calculate an increased temperature of the at least one electric wire from an initial temperature that exists at a time that an estimate begins, based on (1) the load current that has been detected and a thermal characteristic of the at least one electric wire and (2) the values from the storage portion for the plurality of loads that are receiving current and
estimate a temperature of the at least one electric wire by adding the increased temperature to the initial temperature; and
a protection circuit configured to determine whether the estimated temperature of the at least one electric wire is equal to or higher than a specified upper limit temperature, and turns off the switch portion and suspends a supply of power from the power source to the subject load when it is determined that the estimated temperature of the at least one electric wire is equal to or higher than the specified upper limit temperature.

8. The electric-wire protection device as set forth in claim 7, wherein the values stored in the storage portion are temperature values.

* * * * *